No. 714,400. Patented Nov. 25, 1902.
M. C. RYPINSKI.
ELECTROLYTIC CELL.
(Application filed Apr. 25, 1900.)
(No Model.)
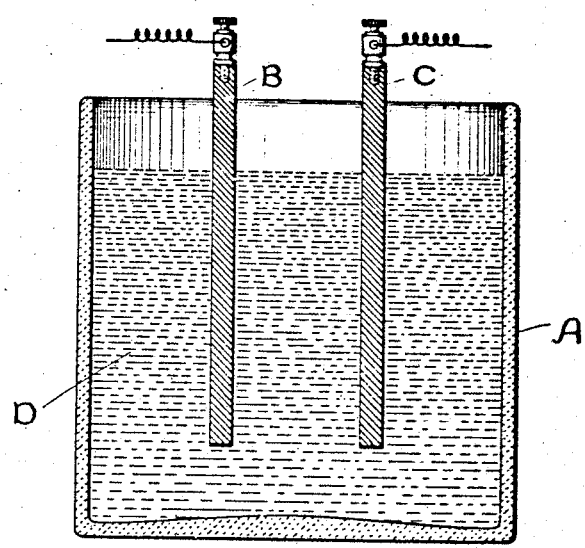
Witnesses:
Lewis P. Abell.
Benjamin B. Hull.
Inventor:
Maurice C. Rypinski
by Albert G. Davis
Atty

UNITED STATES PATENT OFFICE.

MAURICE C. RYPINSKI, OF SCHENECTADY, NEW YORK, ASSIGNOR TO THE GENERAL ELECTRIC COMPANY, A CORPORATION OF NEW YORK.

ELECTROLYTIC CELL.

SPECIFICATION forming part of Letters Patent No. 714,400, dated November 25, 1902.

Application filed April 25, 1900. Serial No. 14,273. (No model.)

*To all whom it may concern:*

Be it known that I, MAURICE C. RYPINSKI, a citizen of the United States, residing at Schenectady, county of Schenectady, State of New York, have invented certain new and useful Improvements in Electrolytic Cells, of which the following is a specification.

My invention relates to certain improvements in electrolytic cells, commonly known in the art as "polarization-cells." Such a cell, as is well known, possesses the property of opposing an apparent electromotive force to the passage of current through it in one direction, which opposition disappears as the current is reversed. This property of the cell may be utilized in changing alternating current into direct current or for simulating the effect of a condenser. For the first purpose the electrodes should be of different material—such, for example, as carbon and aluminium—while for the latter purpose they should be of similar material, as aluminium. Such a cell as heretofore constructed is open to the objection that a hard barnacle-like formation gathers on the aluminium plates and so far interferes with the action of the cell as to render it useless after a comparatively short period of operation. I have found that a solution of the potassium and sodium salt of tartaric acid, commonly known in the arts as "Rochelle salts," is particularly adapted to form the electrolyte, and when so used the electrodes of the cell remain as clean after many weeks use as when first put into operation.

The drawing illustrates an embodiment of my invention, in which A represents a containing vessel, B and C the electrodes, and D the electrolyte, consisting of a solution of a salt of an organic acid—such, for example, as an aqueous solution of Rochelle salts, mentioned above.

What I claim as new, and desire to secure by Letters Patent of the United States, is—

1. An electrolytic cell provided with electrodes, and an electrolyte containing a salt of an organic acid.

2. An electrolytic cell provided with electrodes one at least of which is of aluminium, and an electrolyte consisting of a solution of a salt of an organic acid.

3. An electrolytic cell provided with electrodes, one at least of which is of aluminium, and an electrolyte consisting of a solution of Rochelle salts.

4. An electrolytic cell provided with electrodes, one of which is of aluminium, and an electrolyte containing Rochelle salts.

In witness whereof I have hereunto set my hand this 21st day of April, 1900.

MAURICE C. RYPINSKI.

Witnesses:
BENJAMIN B. HULL,
MABEL E. JACOBSON.